United States Patent Office 3,829,496
Patented Aug. 13, 1974

3,829,496
PROCESS FOR THE PRODUCTION OF
4,4'-DIBROMOBENZIL
Alexander Sieber, Muttenz, and Hermann Kny, Fullinsdorf, Switzerland, and Ward H. Oliver, Mobile, Ala., assignors to Ciba-Geigy AB, Basel, Switzerland, and Ciba-Geigy Corporation, Ardsley, N.Y.
No Drawing. Continuation-in-part of abandoned application Ser. No. 53,303, July 8, 1970. This application July 2, 1971, Ser. No. 159,565
Int. Cl. C07c 49/80
U.S. Cl. 260—590         4 Claims

ABSTRACT OF THE DISCLOSURE

A new process is provided for producing 4,4'-dibromobenzil in high purity and in high yields by reacting benzoin and urea in the presence of an inert, water-insoluble organic solvent, brominating the intermediate 4,5-diphenylimidazol-2-one and oxidizing the obtained 4,5-bis-(4'-bromophenyl)-imidazol-2-one to 4,4'-dibromobenzil.

CROSS REFERENCE

This application is a continuation-in-part of copending application Ser. No. 53,303 filed on July 8, 1970 now abandoned.

DETAILED DISCLOSURE

The present invention relates to a process for the production of 4,4'-dibromobenzil in high purity and in high yields.

The product of the present process, i.e. 4,4'-dibromobenzil is an intermediate useful in the preparation of 4,4'-dibromobenzilic acid esters which are valuable as agents for combatting insects and acarinae. An especially valuable commercial compound which is used as insecticide is 4,4'-dibromobenzilic acid isopropylester.

It is known from H. Biltz, Ann. *368*, 173 (1909) that by reacting benzoin with urea in the presence of glacial acetic acid at temperature of about 115° C., 4,5-diphenyl-imidazol-2-one is obtained, which in turn after having been dried, is brominated in the presence of glacial acetic acid, oxidized with bromine and hydrolised with bromine in diluted acetic acid to obtain 4'4'-dibromo-benzil (H. Biltz, Ber. *41*, 1761 (1908)). The preparation of 4,4'-dibromobenzil according to this procedure requires that the 4,5-diphenylimidazol-2-one be separated and dried to permit the obtainment of the final 4,4'-dibromobenzil in a yield of about 70% calculated on the starting benzoin.

The process according to the present invention for the production of 4,4'-dibromobenzil comprises reacting benzoin with urea in the presence of an inert water-insoluble organic solvent at temperatures of from 100 to 200° C., brominating the 4,5-diphenylimidazol-2-one thus obtained to from 4,5-bis-(4'-bromophenyl)-imidazol-2-one and oxidizing the bromination product to form 4,4'-dibromobenzil.

The process according to the invention can be illustrated by the following scheme:

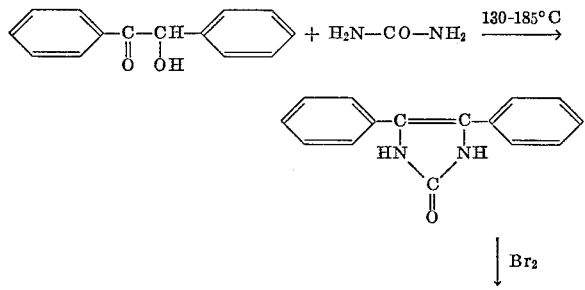

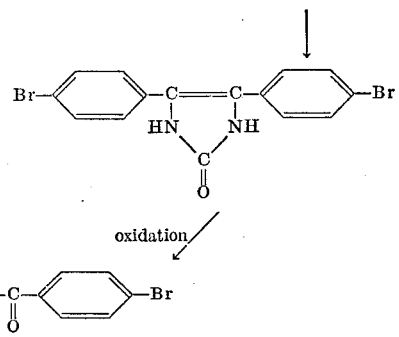

The process according to the invention is advantageously carried out in the same solvent without separating any of the different intermediates; the intermediates however may optionally also be isolated. Moreover, the condensation of benzoin and urea may also be carried out in the presence of an acid as catalyst.

As a rule benzoin and urea are used in equimolecular amounts. The operability of the condensation however is not limited to this ratio; it is possible to use a ratio of benzoin to urea of up to 1:4.

Inert, water-insoluble organic solvents which come into consideration for carrying out the process according to the invention are aromatic or aliphatic hydrocarbons which may be solid or liquid, saturated or unsaturated, substituted or unsubstituted. Suitable substituents are halogen, lower alkyl, lower alkoxy and the $NO_2$-group. Especially advantageous solvents are lower alkanes containing 1 to 4 carbon atoms or mono- or polycyclic aromatic hydrocarbons which are substituted by halogen, preferably at least one chlorine or $—NO_2$. Examples of such solvents are i.a. 1,1,2,2-tetrachloroethane, nitromethane, tetrachloromethane, chlorobenzene, nitrobenzene and above all o-dichlorobenzene.

The acids which may be used as catalysts are as a rule of organic origin. They may contain one or several acidic groups advantageously carboxylic and/or sulfonic acid groups. Examples of suitable acids are i.a. benzoic acid, p-toluenesulfonic acid, salicylic acid and oxalic acid.

The bromination is carried out with the usual brominating agents for aromatic substitution. Such agents are i.a. bromine, N-bromo-succinic acid imide, sodium bromide in the presence of concentrated sulfuric acid, potassium bromate and sodium bromide in the presence of acetic acid or potassium bromate and gaseous hydrobromic acid. The temperature at which the bromination is performed may vary within the range of from 20 to 100° C.

The oxidation to the 4,4'-dibromobenzil may be carried out in known manner and with usual oxidizing agents. Examples of such oxidizing agents are i.a. nitric acid, chlorine gas, chlorine gas in concentrated or diluted mineral acids such as diluted sulfuric acid or concentrated hydrochloric acid, or aqueous or acidic especially mineral acidic solution of bromine such as solutions in phosphoric or sulfuric acid. It is especially advantageous to perform the oxidation with a suspension of the bromination product in the organic solvent at a temperature of up to 100° C.

The isolation of 4,4'-dibromobenzil is carried out advantageously by means of a steam distillation. The crude dibromobenzil is then recrystallized from that solvent in which the process was carried out. However, it is also possible to use another suitable solvent.

In a preferred embodiment of the present invention the reaction of benzoin with urea is performed in the presence of o-dichlorobenzene and benzoic or p-toluenesulfonic acid at temperatures of from 140–185° C. The bromination of the 4,5-diphenylimidazol-2-one is performed at temperatures preferably of from 80 to 100° C.

The oxidation of the 4,5-bis-(4'-bromophenyl)-imidazol-2-one is performed by the usual oxidizing means, preferably with concentrated nitric acid at temperatures below 60° C., preferably below 40° C.

The process according to the invention provides some important advantages over the procedures hitherto used in the preparation of 4,4'-dibromobenzil:

(a) the solvents recommended herein especially o-dichlorobenzene dissolve 4,4'-dibromobenzil at temperatures in excess of about 150° C., permitting the separation of insoluble by-products;

(b) the solubility of 4,4'-dibromobenzil in the said solvents especially in o-dichlorobenzene decreases rapidly at temperatures below 150° C. while the remaining impurities are quite soluble at temperatures well below 150° C.;

(c) due to the relatively high boiling points of the solvents the benzoin-urea reaction may be carried out in shorter time without resorting to pressure;

(d) the solvents are largely resistant to both bromination and oxidation by nitric acid under the reaction conditions;

(e) the quantity of bromine used is only about 65% as much bromine as used in the known process;

(f) the yield of 4,4'-dibromobenzil calculated on the starting benzoin is about 80% by weight, while according to the known process yields of only about 70% by weight were obtained;

(g) the first step of the process according to the invention is operated in a completely anhydrous medium, since the water formed during the condensation of benzoin with urea, is driven off completely by the high reaction temperature enabling in this way both to increase the yields of 4,5-diphenylimidazol-2-one up to about 93% (instead of about 80% of the known process) and to eliminate the necessity of isolating the 4,5-di-phenyl-imidazol-2-one obtained in order to remove the water from this product which additional isolation step has previously been necessary in the known process;

(h) the solvents used during the reaction can be recovered by simple distillation or steam distillation while at the end of the known process very diluted acetic acid is left, which can only be concentrated by means of a very expensive process. Due to its high BOD (biochemical oxygen demand) it cannot simply be disposed as normal waste in the sewage system.

The following non-limitative examples serve to illustrate the process of the invention.

Example 1

In a 1500 ml. flask equipped with a reflux condenser and water separator, 137 g. (1.12 mol) of benzoic acid and 160 g. of o-dichlorobenzene are heated with stirring to an inner temperature of 175° C. To this solution a suspension of 170 g. (0.8 mol) of benzoin and 53 g. (0.88 mol) of urea in 360 g. of o-dichlorobenzene is slowly added during about 40 minutes in such a manner that the inner temperature does not drop below 145° C. and the water which forms is immediately removed by distillation. Stirring of the yellow solution is continued for half an hour at an inner temperature of 165–170° C. The mixture is cooled with stirring, and at about 110° C. a precipitate is formed which becomes thicker on further cooling.

At an inner temperature of 75 to 85° C., 320 g. (2.0 mol), of bromine are added in portions during about 15 minutes, while the temperature is maintained below 95° C. The reaction product is stirred at an inner temperature of 90° C. for 8 hours, whereupon the thinly liquid suspension is cooled with stirring to room temperature. This suspension is stirred and added in portions during about 1 hour to 267 g. of 63% concentrated nitric acid (200 ml.) of room temperature in a 2500 ml. sulphating flask. Immediately after the addition of the first portion an exothermic reaction takes place with the development of gas. The reaction temperature is kept at 20–25° C. with an ice bath. A heavy brown slurry is formed which is stirred for 10 hours at room temperature.

Bromine and dichlorobenzene are removed from the reaction product by steam distillation. The obtained crude dibromobenzil is worked up by stirring it three times, each time using 1000 ml. of boiling water and decanting the aqueous phase. The wet, crude dibromobenzil is heated in 700 g. of o-dichlorobenzene to about 155° C. while simultaneously removing water. The strongly turbid yellow solution is filtered as hot as possible and the filter residue is washed with about 100 g. of o-dichlorobenzene having a temperature of 150° C. Needle-shaped crystals begin immediately to separate from the clear yellow filtrate. After cooling to room temperature, the crystallized dibromobenzil is filtered under suction and washed with 80 g. of isopropanol.

After drying in a vacuum oven at 90° C./20 mm. Hg, 235 g. of 4,4'-dibromobenzil (80% calculated on benzoin) are obtained; m.p. 227–228°-C. corrected; purity: >99% according to thin layer and gas chromatograms.

The same yield of 4,4'-dibromobenzil is achieved when only 73 g. (0.6 mol) of benzoic acid are used as catalyst for the condensation of benzoin and urea.

Example 2

In a 1500 ml. flask equipped with a reflux condenser and water separator, 137 g. (1.12 mol) of benzoic acid and 220 g. of 1,1,2,2-tetrachloroethane are heated with stirring to reflux (146° C.). To this solution a suspension of 170 g. (0.8 mol) of benzoin and 53 g. (0.88 mole) of urea in 300 g. of tetrachloroethane is slowly added during about 40 minutes in such a manner that the inner temperature does not drop below 135° and the water which forms (13 ml.) is immediately removed by distillation. Stirring of the yellow slurry is continued for half an hour at an inner temperature of 145° C. The mixture is cooled with stirring.

Bromination, oxidation and isolation of the end product are performed as described in Example 1 using tetrachloroethane as solvent for the isolation operation.

After drying in a vacuum oven at 90° C./20 mm. Hg, 172 g. of 4,4'-dibromobenzil (59% calculated on benzoin) are obtained; m.p. 227–228° C. corrected; purity: >99% according to thin layer and gas chromatograms.

Example 3

In a 1000 ml. flask equipped with a reflux condenser and a water separator 100 g. of nitrobenzene are heated to 170° C. To this solvent a suspension of 85.4 g. (0.7 mol) of benzoic acid, 106 g. (0.05 mol) of benzoin and 57 g. (0.95 mol) of urea in 165 g. of nitrobenzene are slowly added during about 40 minutes in such a manner that the inner temperature does not drop below 150° C. and water which forms is mmediately removed by distillation. Stirring of the yellow slurry is continued for half an hour at an inner temperature of 160° C. The mixture is cooled with stirring and at about 150° C. a precipitate is formed which becomes thicker on further cooling.

Bromination, oxidation and isolation of the final product are performed as described in Example 1 using nitrobenzene as solvent for the isolation operation.

After drying in a vacuum oven at 90° C./20 mm. Hg, 112 g. of 4,4'-dibromobenzil (61% calculated on benzoin) are obtained; m.p. 227–228° C. corrected; purity: >99% according to thin layer and gas chromatograms.

Example 4

In a 1500 ml. flask equipped with a reflux condenser and water separator, 7 g. (0.04 mol) of p-toluenesulfonic acid and 160 g. of o-dichlorobenzene are heated with stirring to an inner temperature of 175° C. To this solution a suspension of 170 g. (0.8 mol) of benzoin and 48 g. (0.8 mol) of urea in 360 g. of o-dichlorobenzene are slowly added during about 40 minutes in such a manner that the inner temperature does not drop below 145° C. and the water which forms (26 ml.) is immediately removed by distillation. Stirring of the yellow slurry is continued for half an hour at an inner temperature of 165–170° C. The mixture is cooled with stirring;

Bromination, oxidation and isolation of the final product are performed as described in Example 1.

After drying in a vacuum oven at 90° C./20 mm. Hg, 222 g. of 4,4'-dibromobenzil (75.5% calculated on benzoin) are obtained; m.p. 227–228° C. corrected; purity: >99% according to thin layer and gas chromatograms.

Example 5

In a 1500 ml. flask equipped with a reflux condenser and a water separator a suspension of 170 g. (0.8 mol) of benzoin and 53 g. (0.88 mol) of urea in 360 g. of o-dichlorobenzene is heated for 40 minutes to a temperature of 145 to 160° C. The water which forms on the reaction is continuously removed by distillation. Stirring of the yellow solution is continued for 30 minutes at an inner temperature of 165 to 170° C. The mixture is then cooled with stirring. At about 110° C. a precipitate is formed which becomes thicker on further cooling.

Bromination, oxidation and isolation of the final product are performed as described in Example 1.

After drying in a vacuum oven at 90° C./20 mm. Hg, 182 g. of 4,4'-dibromobenzil (62% calculated on benzoin) are obtained; m.p. 227–228° C. corrected; purity: >99% according to thin layer and gas chromatograms.

We claim:

1. A process for the production of 4,4'-dibromobenzil which comprises
   (a) reacting benzoin with urea in a ratio of 1:1 to 1:4 at temperatures of from 100 to 200° C. and in the presence of an inert, water-insoluble organic solvent selected from the group consisting of o-dichlorobenzene, nitrobenzene and 1,1,2,2-tetrachloroethane,
   (b) reacting the resulting 4,5-diphenylimidazol-2-one with bromine or N-bromosuccinic acid imide at temperatures of from 20 to 100° C. to produce 4,5-bis-(4'-bromophenyl)-imidazol-2-one,
   (c) reacting this bromination product with an oxidizing agent selected from the group consisting of nitric acid, chlorine gas, chlorine gas in concentrated or diluted mineral acids and aqueous or acidic solutions of bromine at a temperature of up to 100° C., and
   (d) recovering 4,4'-dibromobenzil.

2. A process according to claim 1 which comprises condensing benzoin and urea in the presence of a carboxylic or sulfonic acid catalyst selected from the group consisting of benzoic, p-toluenesulfonic, salicylic and oxalic acid.

3. A process according to claim 2 which comprises as catalyst a member selected from the group consisting of benzoic acid, and p-toluenesulfonic acid.

4. A process according to claim 1, which comprises (a) reacting benzoin with urea in equimolecular amounts in the presence of o-dichlorobenzene at 140 to 185° C., (b) reacting the resulting 4,5-diphenylimidazol-2-one with bromine at 80 to 100° C. to produce 4,5-bis-(4'-bromophenyl)imidazol-2-one, (c) reacting this bromination product with nitric acid at a temperature below 60° C., and (d) recovering 4,4'-dibromobenzil.

References Cited

Biltz, Ber. Deut., Chem., 41, 1754–1767 (1908).
Biltz, Liebig's Annalen 368, 173–178 (1909).

DANIEL D. HORWITZ, Primary Examiner